United States Patent
Kumar et al.

(10) Patent No.: US 11,689,431 B2
(45) Date of Patent: *Jun. 27, 2023

(54) SLA PACKET STEERING IN NETWORK SERVICE FUNCTION CHAINING

(71) Applicant: Juniper Networks, Inc., Sunnyvale, CA (US)

(72) Inventors: Rajneesh Kumar, Bangalore (IN); Peyush Gupta, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/657,322

(22) Filed: Mar. 30, 2022

(65) Prior Publication Data

US 2022/0224607 A1 Jul. 14, 2022

Related U.S. Application Data

(63) Continuation of application No. 16/824,523, filed on Mar. 19, 2020, now Pat. No. 11,329,897.

(51) Int. Cl.
*H04L 41/5025* (2022.01)
*H04L 41/5009* (2022.01)
*H04L 47/2425* (2022.01)
*H04L 69/22* (2022.01)

(52) U.S. Cl.
CPC ...... *H04L 41/5025* (2013.01); *H04L 41/5009* (2013.01); *H04L 47/2425* (2013.01); *H04L 69/22* (2013.01)

(58) Field of Classification Search
CPC .......................... H04L 43/0864; H04L 43/106
See application file for complete search history.

(56) References Cited

U.S. PATENT DOCUMENTS

| 9,413,634 B2 | 8/2016 | Nadeau et al. |
| 9,548,919 B2 | 1/2017 | Guichard et al. |

(Continued)

FOREIGN PATENT DOCUMENTS

| CN | 104318407 A | 1/2015 |
| CN | 104780099 A | 7/2015 |
| CN | 107078950 A | 8/2017 |

OTHER PUBLICATIONS

First Office Action and Search Report, and translation thereof, from counterpart Chinese Application No. 202010495576.5 dated Jul. 21, 2022, 29 pp.

(Continued)

*Primary Examiner* — Romani Ohri
(74) *Attorney, Agent, or Firm* — Shumaker & Sieffert, P.A.

(57) ABSTRACT

This disclosure describes techniques that include adding information to a network service header in packets being processed by a set of compute nodes in a service chain. The information added to the network service header can be used during selection of the next hop in a service chain, and may be used to help ensure that service level agreements (SLA) are met with respect to one or more metrics. In one example, this disclosure describes a method that includes receiving, by a service complex having a plurality of service nodes, a packet associated with a service chain representing a series of services to be performed on the packet by one or more of the plurality of service nodes; identifying, by the service complex, one or more service chain constraints associated with the service chain; and modifying the packet, by the service complex, to include information about the service chain constraints.

16 Claims, 5 Drawing Sheets

(56) References Cited

U.S. PATENT DOCUMENTS

| | | | | |
|---|---|---|---|---|
| 10,116,553 | B1* | 10/2018 | Penno | H04L 45/306 |
| 10,530,632 | B1 | 1/2020 | Mukhopadhyaya et al. | |
| 2016/0134472 | A1* | 5/2016 | Guan | H04L 45/026 |
| | | | | 709/222 |
| 2016/0381175 | A1* | 12/2016 | Wu | H04L 67/322 |
| | | | | 709/240 |
| 2017/0237656 | A1* | 8/2017 | Gage | H04L 61/2521 |
| | | | | 370/392 |
| 2019/0081720 | A1* | 3/2019 | Barry | H04W 56/0015 |
| 2019/0306051 | A1* | 10/2019 | Seetharaman | H04L 45/42 |
| 2021/0297327 | A1 | 9/2021 | Kumar et al. | |

OTHER PUBLICATIONS

Chau et al., "Dynamic Forwarding by Constraint Options in SFC; draft-chau-sfc-dynamic-forwarding-by-constraints-OO.txt," SFC Working Group, Internet Draft, Jun. 30, 2015, 8 pp.

Extended Search Report from counterpart European Application No. 20178385.9, dated Nov. 27, 2020, 13 pp.

Mirsky et al., "Performance Measurement (PM) with Alternate Marking Method in Service Function Chaining (SFC) Domain; draft-mirsky-sfc-pmamm-09.txt," SFC Working Group, Internet—Draft, Dec. 20, 2019, 8 pp.

Prosecution History from U.S. Appl. No. 16/824,523, dated Sep. 30, 2021 through Apr. 11, 2022, 77 pp.

Quinn et al., "Network Service Header (NSH),"Internet Engineering Task Force (IETF), RFC 8300, Jan. 2018, 40 pp.

Response to Extended Search Report dated Nov. 27, 2020, from counterpart European Application No. 20178385.9 filed Mar. 22, 2022, 15 pp.

Sarikaya et al., "Service Function Chaining: Subscriber and Performance Policy Identification Variable-Length Network Service Header (NSH) Context Headers; draft-ietf-sfc-serviceid-header-04. txt," SFC Internet—Draft, Oct. 30, 2019, 9 pp.

* cited by examiner

SLA PACKET STEERING IN NETWORK SERVICE FUNCTION CHAINING

CROSS REFERENCE

This application is a continuation application of and claims priority to U.S. patent application Ser. No. 16/824,523 filed on Mar. 19, 2020, which is hereby incorporated by reference herein in its entirety.

TECHNICAL FIELD

The disclosure relates to computer networks and, more specifically, to applying network services to data traffic traversing computer networks.

BACKGROUND

A computer network is a collection of interconnected computing devices that can exchange data and share resources. In a packet-based network, the computing devices communicate data by dividing the data into small blocks called packets, which are individually routed across the network from a source device to a destination device. The destination device extracts the data from the packets and assembles the data into its original form. Dividing the data into packets enables the source device to resend only those individual packets that may be lost during transmission.

Network service providers provide services such as security, tunneling, virtual private networks, filtering, load-balancing, VoIP/Multimedia processing, proxies, and other types of services to incoming packets. Service providers also provide content-specific services designed to improve the quality of a user's experience, for example, video streaming and caching. To provide these new services, a network service provider may direct packets along a "service chain," where the service chain represents a set of functions that are applied to the packet virtual or physical compute nodes.

SUMMARY

This disclosure describes techniques that include adding information to a network service header for packets being processed by a set of compute nodes in a network service chain. The information added to the network service header can be used during selection of the next hop in a service chain, and may be used to help ensure that service level agreements (SLA) or other constraints are met with respect to one or more metrics. In some examples, techniques described herein may involve including SLA information in a network service header, and enabling each of the nodes in a service chain to dynamically update the information as the packet is processed in the service chain. For instance, in some examples, service nodes each maintain a table of information about round-trip times (RTT) between adjacent nodes in a service chain. As each node processes a packet in a service chain, each node includes, within the network service header, information about the current metrics relative to the SLA requirements. For instance, as each node in a service chain processes a network packet, each node may update the network packet to include information about how much RTT remains relative to an SLA requirement for the overall RTT to be consumed by the service chain. Accordingly, the information stored within the network services header for the packet may change dynamically as that packet is processed in the service chain. Such metrics that may be reflected in a network services header may include RTT, as wells as other metrics, including as jitter and packet loss tolerances. Accordingly, this disclosure describes techniques that include embedding, within a network packet, information about one or more metrics (e.g., those subject to an SLA requirement) and updating such information as that packet is processed in a service chain. Techniques described herein may be implemented as an extension of the network service header metadata described in RFC 8300.

The techniques described herein may provide one or more technical advantages. For instance, by including information about SLA requirements within a network packet, appropriate selections of network service function routes or paths can be more effectively made in light of SLA requirements. Including information about SLA requirements, and dynamically updating such information through the service chain is an easier, more efficient, and more accurate way to help ensure that network service function nodes are properly selected to satisfy SLA requirements. Maintaining such information within the network service header is, compared to prior techniques for helping to ensure compliance with SLAs, easier, more efficient, and more accurate. Further, including dynamically-updated SLA information within each packet also helps ensure that up-to-date information about progress in satisfying SLA requirements for a given packet is available.

In some examples, this disclosure describes operations performed by a network services complex, compute node, or other system in accordance with one or more aspects of this disclosure. In one specific example, this disclosure describes a computing system comprising processing circuitry and a plurality of service nodes, wherein the processing circuitry is configured to: receive a packet; identify a performance constraint associated with a service chain representing a series of service functions to be performed on the packet by one or more of the service nodes; determine an expected impact that performance of a service function will have on satisfying the performance constraint, wherein the service function is one of the series of service functions to be performed on the packet; and modify the packet to reflect the expected impact that performance of the service function will have on satisfying the performance constraint.

In another example, this disclosure describes a method comprising receiving, by a computing system comprising a plurality of service nodes, a packet associated with a service chain representing a series of services to be performed on the packet; identifying, by the computing system, a performance constraint associated with the service chain; determining, by the computing system, an expected impact that performance of a service function will have on satisfying the performance constraint, wherein the service function is one of the series of services to be performed on the packet; and modifying the packet, by the computing system, to reflect the expected impact that performance of the service function will have on satisfying the performance constraint.

In another example, this disclosure describes a computer-readable storage medium comprising instructions that, when executed, configure processing circuitry of a computing system to receive a packet; identify a performance constraint associated with a service chain representing a series of service functions to be performed on the packet by one or more service nodes; determine an expected impact that performance of a service function will have on satisfying the performance constraint, wherein the service function is one of the series of service functions to be performed on the packet; and modify the packet to reflect the expected impact that performance of the service function will have on satisfying the performance constraint.

DETAILED DESCRIPTION

Figure 1:
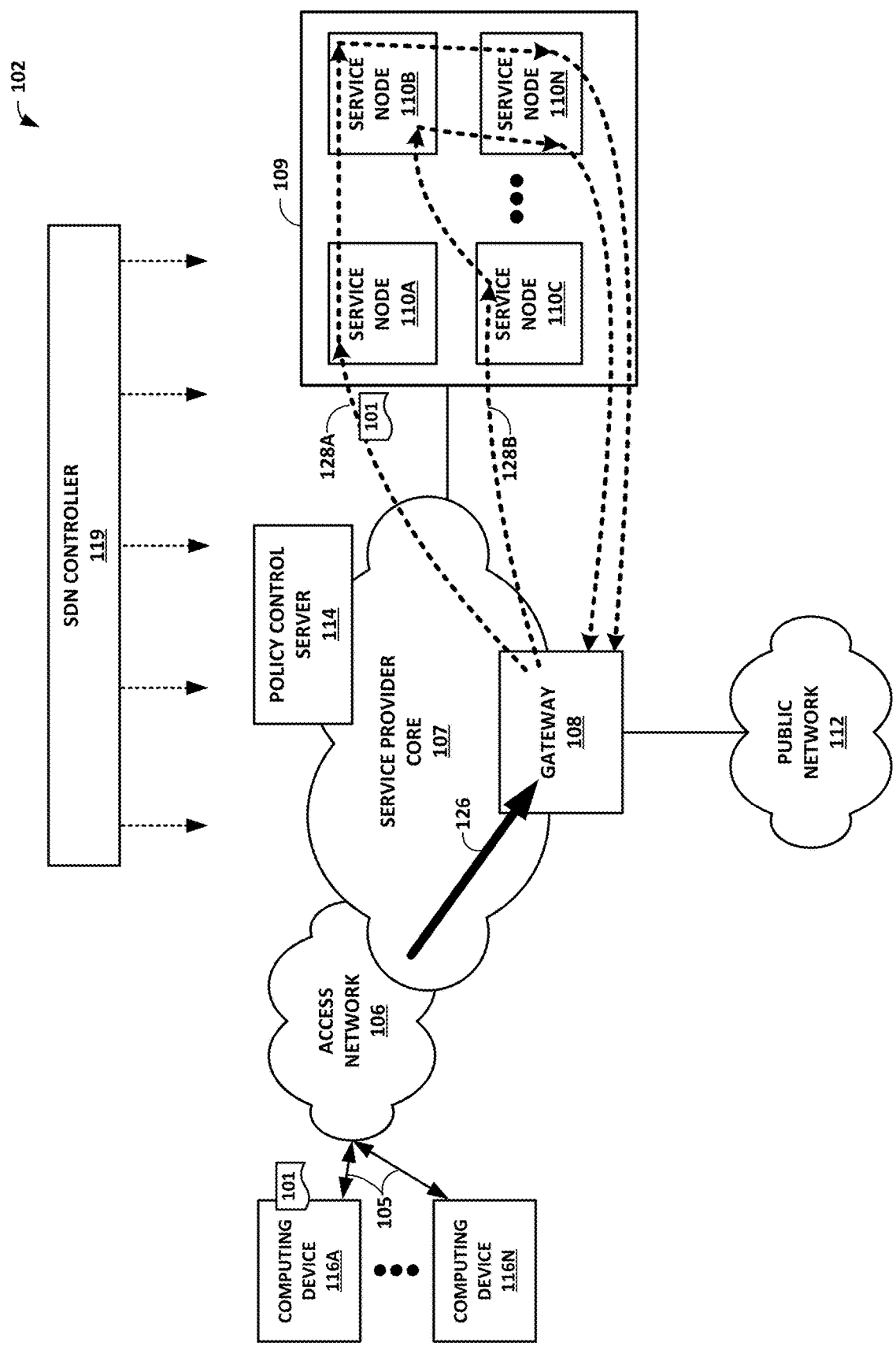
FIG. 1 illustrates an example network system for processing a packet in a service chain, in accordance with one or more aspects of the present disclosure.

FIG. 1 illustrates an example network system for processing a packet in a service chain, in accordance with one or more aspects of the present disclosure. The example network system of FIG. 1 includes a service provider network 102 that operates as a private network to provide packet-based network services to computing devices 116A to 116N (collectively, "computing devices 116," and representing any number of computing devices). That is, service provider network 102 may provide authentication and establishment of network access for computing devices 116 such that each of computing devices 116 may begin exchanging data packets with public network 112, which may be an internal or external packet-based network such as the Internet.

In the example of FIG. 1, service provider network 102 comprises access network 106 that provides connectivity to public network 112 via service provider core network 107 and gateway 108. Gateway 108 may apply various network service functions through services complex 109 applying functions pursuant to one or more service chains 128. Service provider core network 107 (hereinafter "core network 107"), gateway 108, services complex 109, and/or public network 112 may provide packet-based services that are available for request and use by computing devices 116. As examples, core network 107, gateway 108, services complex 109, and/or public network 112 may provide, for example, bulk data delivery, voice over Internet protocol (VoIP), Short Messaging Service (SMS), Wireless Application Protocol (WAP) service, or customer-specific application services.

Public network 112 may comprise, for instance, a local area network (LAN), a wide area network (WAN), the Internet, a virtual LAN (VLAN), an enterprise LAN, a layer 3 virtual private network (VPN), an Internet Protocol (IP) intranet operated by the service provider that operates access network 106, an enterprise IP network, or some combination thereof. In various examples, public network 112 is connected to a public WAN, the Internet, or to other networks. Public network 112 executes one or more packet data protocols (PDPs), such as IP (IPv4 and/or IPv6), X.25 or Point-to-Point Protocol (PPP), to enable packet-based transport of public network 112 services.

Computing devices 116 connect to gateway 108 via access network 106 to receive connectivity to services for applications executing on or hosted by computing devices 116. Each of computing devices 116 may be, for example, any appropriate mobile or non-mobile computing device, typically operated by a user. Each of computing devices 116 may run a variety of software applications, such as productivity or office support software, web browsing software, software to support voice calls, video games, videoconferencing, and email, among others. Computing devices 116 connect to access network 106 via access links 105 that comprise wired and/or wireless communication links. The term "communication link," as used herein, may comprise any form of transport medium, wired or wireless, and can include intermediate nodes such as network devices.

A network service provider may operate, or in some cases lease, elements of access network 106 to provide packet transport between computing devices 116 and gateway 108. Access network 106 represents a network that aggregates data traffic from one or more user devices (e.g., computing devices 116) for transport to/from core network 107 of the service provider. Access network 106 includes network nodes that execute communication protocols to transport control and user data to facilitate communication between computing devices 116 and gateway 108. Access network 106 may include a broadband access network, network, a wireless LAN, a public switched telephone network (PSTN), or other type of access network, and may include or otherwise provide connectivity for cellular or mobile access networks.

Core network 107 offers packet-based connectivity to computing devices 116 attached to access network 106 for accessing public network 112. Core network 107 may represent a public network that is owned and operated by a service provider to interconnect a plurality of networks, which may include access network 106. Core network 107 may implement Multi-Protocol Label Switching (MPLS) forwarding and in such instances may be referred to as an MPLS network or MPLS backbone. In some instances, core network 107 represents a plurality of interconnected autonomous systems, such as the Internet, that offers services from one or more service providers. Public network 112 may represent an edge network coupled to core network 107, e.g., by a customer edge device such as customer edge switch or router. Public network 112 may include a data center.

A network service provider that administers at least parts of service provider network 102 typically offers services to computing devices 116, such as, for example, traditional Internet access, Voice-over-Internet Protocol (VoIP), video and multimedia services, and security services. As described above with respect to access network 106, core network 107 may support multiple types of access network infrastructures that connect to service provider network access gateways to provide access to the offered services. In some instances, network system may include computing devices 116 that attach to multiple different access networks 106 having varying architectures.

In general, any one or more of computing devices 116 may request authorization and data services by sending a session request to gateway 108. In turn, gateway 108 typically authenticates such computing devices 116. Once authenticated, each such computing device 116 may send subscriber data traffic toward core network 107 in order to access and receive services provided by public network 112, and such packets traverse gateway 108 as part of at least one packet flow. Flow 126 illustrated in FIG. 1 represents one or more upstream packet flows from any one or more computing devices 116 and directed to public network 112. The term "packet flow," "traffic flow," or simply "flow" refers to a set of packets originating from a particular source device and sent to a particular destination device.

As described herein, service provider network includes services complex 109 having a cluster of service nodes 110A to 110N ("service nodes 110," and representing any number of service nodes) that provide an execution environment for the network services. That is, each of service nodes 110 apply one or more services. As examples, service nodes 110 may apply firewall and security services, carrier grade network address translation (CG-NAT), media optimization (voice/video), IPSec/VPN services, deep packet inspection (DPI), HTTP filtering, counting, accounting, charging, and load balancing of packet flows or other types of services applied to network traffic. Each of service nodes 110 in this way represents a service instance.

Although illustrated as part of a services complex 109, which may represent a data center, service nodes 110 may, for instance, be coupled by one or more switches or virtual switches of core network 107. In one example, each of service nodes 110 may run as a virtual machine in virtual compute environment. Moreover, the compute environment may comprise a scalable cluster of general computing devices or servers. As another example, service nodes 110 comprise a combination of general purpose computing devices and special purpose appliances. As virtualized, individual network services provided by service nodes 110 can scale just as in a modern data center, through the allocation of virtualized memory, processor utilization, storage and network policies, as well as horizontally by adding additional load-balanced virtual machines. Although described and illustrated to suggest that services complex 109 may be housed in a single data center, services complex 109 may span multiple data centers and/or geographic locations.

As shown in FIG. 1, gateway 108 steers individual packet flows 126 through defined sets of services provided by service nodes 110. That is, each subscriber packet flow may be forwarded through a particular ordered combination of services provided by service nodes 110, each ordered set being referred to herein as a "service chain." In the example of FIG. 1, one or more flows 126 are directed along a first service chain 128A and, therefore, receive services applied by service nodes 110A, 110B and 110N, in that order. Similarly, one or more flows 126 are directed along a second service chain 128B and, therefore, receive services applied by service nodes 110C, 110B and 110N.

In this way, subscriber flows 26 may be processed by service nodes 110 as the packets flow between access network 106 and public network 112 according to service chains configured by the service provider. In the illustrated example, service chain 128A identifies the ordered set of service nodes 110A, 110B, and 110N according to the listed ordering. Service chain 128B identifies the ordered set of service nodes 110C, 110B, and 110N. Accordingly, packet flows 126 processed according to service chain 128A follow a service path that traverses service nodes 110A, 110B, and finally node 110N as the terminal node for service chain 128A. A particular service node 110 may support multiple service chains. In this example, service node 110B supports service chains 128A, 128B.

Once processed at a terminal node of the service chain, i.e., the last service node 110 to apply services to packets flowing along a particular service path, the terminal node may direct the traffic back to gateway 108 for further processing and/or forwarding to public network 112. For example, traffic engineered service paths may start and terminate with gateway 108.

In FIG. 1, software-defined networking controller 119 ("SDN controller 119") provides a high-level controller for configuring and managing routing and switching infrastructure of service provider network 102 (e.g., gateway 108, core network 107 and service nodes 110). In some instances, SDN controller 119 manages deployment of virtual machines within the operating environment of services complex 109. For example, SDN controller 119 may interact with gateway 108 to specify service chain 128A, 128B information. For example, the service chain information provided by SDN controller 119 may specify any combination and ordering of value-added services provided by service nodes 110, traffic engineering information (e.g., labels or next hops) for tunneling or otherwise transporting (e.g., MPLS or IP tunnels) packet flows along service paths, rate limits, Type Of Service (TOS) markings or packet classifiers that specify criteria for matching packet flows to a particular service chain 128A, 128B.

In accordance with one or more aspects of the present disclosure, SDN controller 119 may configure one or more of access network 106, core network 107, and/or gateway 108 to implement one or more policies for packets within service provider network 102. For instance, with reference to FIG. 1, policy control server 114 receives input from an administrator describing policies that are to be carried out on packets and/or packets associated with various applications executing on computing devices 116. Such policies may describe or be used to derive service chain operations that are to be performed on certain packets traversing service provider network 102. Policy control server 114 configures, or causes SDN controller 119 to configure, access networks 106, core network 107, gateway 108, and/or services complex 109 to implement the policies consistent with administrator input.

Service provider network 102 may receive a packet that is to be processed in a service chain subject to a constraint or a service chain performance constraint such as a timing or other requirement mandated by a service level agreement requiring service chain processing within a certain timeframe. For instance, in an example that can be described with reference to FIG. 1, access network 106 receives packet 101 from a device, such as computing device 116A. Access network 106 communicates packet 101 to core network 107, and core network 107 communicates packet 101 to gateway 108. Gateway 108 determines, based on the configuration and/or policies established by policy control server 114 and/or SDN controller 119, that packet 101 is associated with an application that requires specific functions of a service chain be performed on packet 101. Gateway 108 determines that the service chain for packet 101 requires performance of three service functions, and further, that the performance of the three service functions is subject to a service chain performance constraint, or a service level agreement (SLA), requiring that the service chain be completed within an overall round-trip time (RTT) of 100 milliseconds.

Service provider network 102 may select an appropriate service node 110 to perform the first function in the service chain. For instance, still referring to the example being described with reference to FIG. 1, gateway 108 determines which of service nodes 110 should perform the first function in the service chain on packet 101. To make the determination, gateway 108 considers which of service nodes 110 are capable of performing the required service function. Gateway 108 further considers which of service nodes 110 are capable of performing the required service function within the required round-trip time of 100 milliseconds. To determine which of service nodes 110 are capable of performing the required service function within the required time, gateway 108 consults available information about expected round-trip times associated with each of service nodes 110. In the example being described, gateway 108 determines that the service node 110A is capable of performing the first function in the service chain, and that the round-trip time service node 110A is expected to consume in performing the function is 20 milliseconds. In some examples, the expected time required to perform the service function may be specified as a round-trip time or other metric specifying the latency associated with service node 110A performing the required service function.

Service provider network 102 includes information about timing requirements within packet 101 and causes service node 110A to perform the first network service function. For instance, in the example being described with reference to FIG. 1, gateway 108 updates information in the network services header of packet 101 to reflect the timing and/or performance constraint (e.g., SLA) requirements associated with service chain processing for packet 101. In some examples, gateway 108 includes information within packet 101 indicating that after service node 110A performs the first network function, 80 milliseconds will be remaining on RTT SLA (i.e., 80 milliseconds is calculated by subtracting the 20 milliseconds expected to be consumed by service node 110A from the original 100 milliseconds SLA requirement). Further, in some examples, gateway 108 may store alternative or additional information about the RTT SLA in the network services header for packet 101, such as the original RTT SLA requirement (i.e., 100 milliseconds) or information about other metrics specified by policy or SLA requirement. Gateway 108 outputs packet 101 to service node 110A. Service node 110A performs the network service function on packet 101.

Service node 110A selects an appropriate service node 110 to perform the second function in the service chain. For instance, again referring to the example being described with reference to FIG. 1, service node 110A determines an appropriate service node 110 to perform the next (i.e., second) service function in the service chain. To make the determination, service node 110A considers which of service nodes 110 are capable of performing the second service function, and also considers which of service nodes 110 are capable of performing the required service function within the amount of time remaining in the required round-trip time SLA. To determine how much time remains in the round-trip time SLA, service node 110A consults the information that gateway 108 previously stored in the network services header of packet 101, as described above. Service node 110A determines, based on information stored within the network services header for packet 101, that 80 milliseconds remains in the RTT SLA. To determine which of service nodes 110 are capable of performing the required service function within the remaining time, service node 110A consults information about expected round-trip times associated with each of service nodes 110. In some examples, service node 110A maintains a table of information indicating expected round-trip times for each of service nodes 110 for various network functions. Service node 110A may maintain such a table using information based on historical or observed latencies (e.g., round-trip times) or based on probing procedures used to determine the latency between two nodes. In the example being described, service node 110A chooses service node 110B to perform the next network function in the service chain. Service node 110A further determines that in performing the next network function, service node 110B is expected to consume 30 milliseconds.

Service node 110A includes, within packet 101, information about the amount of time remaining in the RTT SLA, and causes service node 110B to perform the second service function. For instance, referring still to FIG. 1, service node 110A determines that after service node 110B performs the second network function, 50 milliseconds are expected to remain from the original SLA requirement of 100 milliseconds (after subtracting the 30 milliseconds expected to be consumed by service node 110B from the 80 milliseconds remaining after service node 110A performs the first network function). Service node 110A forwards packet 101 to service node 110B. Service node 110B performs the network service function on packet 101, completing the second of the three functions in the service chain.

Service node 110B selects an appropriate service node 110 to perform the third and final service function in the service chain. For instance, again with reference to the example being described in connection with FIG. 1, service node 110B determines which of service nodes 110 is to perform the third service function on packet 101. Service node 110B makes this determination based on the service function to be performed, expected RTT values associated with each of service nodes 110, and the remaining SLA RTT time of 50 milliseconds specified by the network services header for packet 101. In the example being described, service node 110B determines, by consulting a table of RTT times associated with each of service nodes 110, that service node 110C is expected to consume 40 milliseconds of RTT (consisting of both the link latency and the service latency). Service node 110B further determines that service node 110B satisfies other requirements (e.g., local policy) for selecting a service node for performing the third network function. Accordingly, in the example being described, service node 110B selects service node 110C to perform the third network services function.

Service node 110B updates the network services header of packet 101 to indicate that after processing by service node 110C, 10 milliseconds is expected to be remaining in the original RTT SLA requirement of 100 milliseconds. Service node 110B forwards the packet 101 (with the updated RTT SLA information included within the network services header) to service node 110C. Service node 110C performs the third network function. Service node 110C determines that service node 110C is the terminal node, and that the service chain is complete. Service node 110C forwards packet 101 back to gateway 108. Gateway 108 forwards packet 101 to public network 112.

The techniques described herein may provide one or more technical advantages. Including information about SLA requirements within a network packet, for example, helps ensure that appropriate selections of network service function routes or paths can be more effectively made in light of SLA requirements. Including information about SLA requirements, and dynamically updating such information through the service chain is an easier, more efficient, and more accurate way to help ensure that network service function nodes are properly selected to satisfy SLA requirements. Maintaining such information within the network service header is, compared to prior techniques for helping to ensure compliance with SLAs, easier, more efficient, and more accurate. Further, including dynamically-updated SLA information within each packet also helps ensure that up-to-date information about progress in satisfying SLA requirements for a given packet is available.

Figure 2:
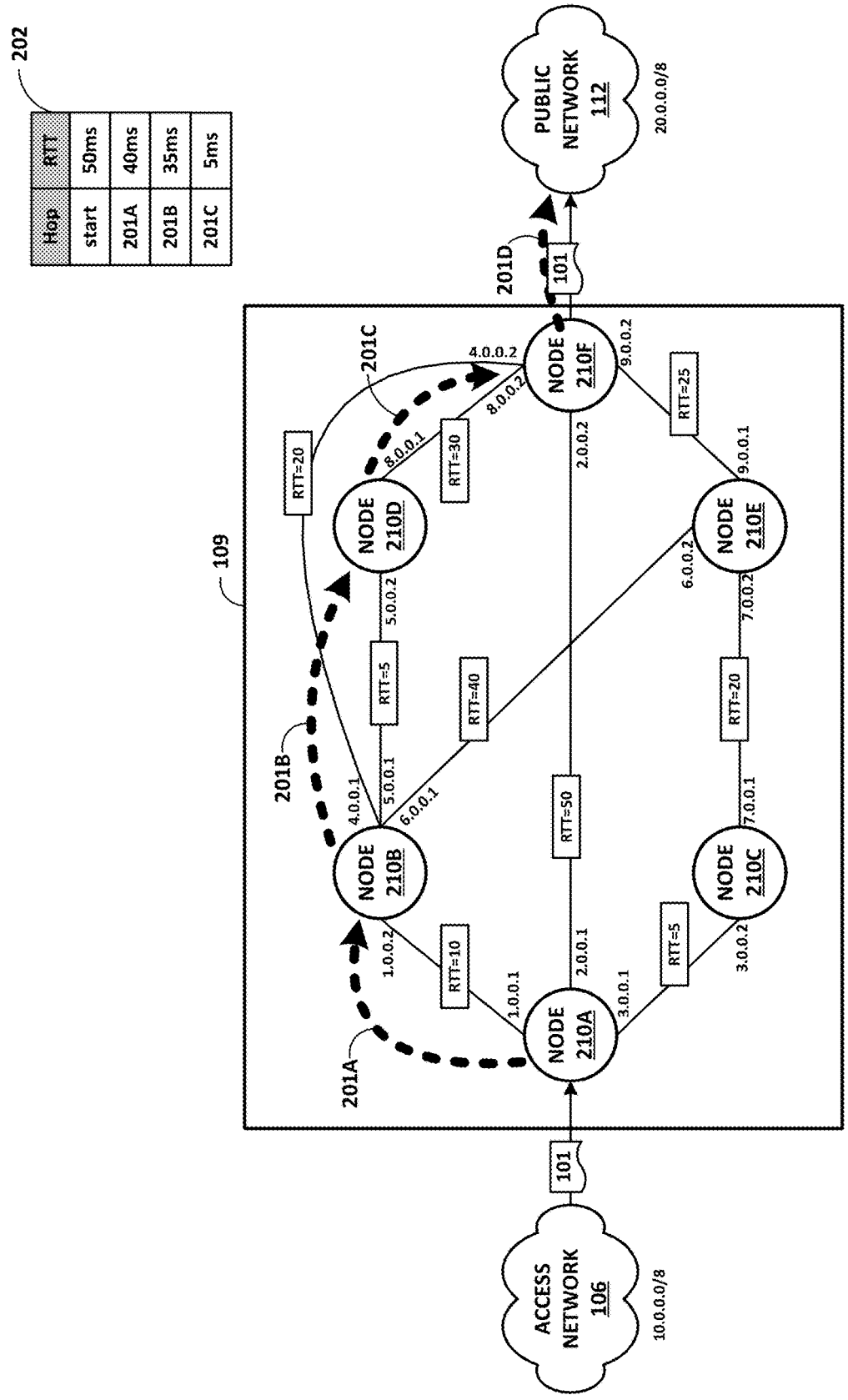
FIG. 2 is a conceptual diagram illustrating processing of an example network packet in a service chain between an example access network and an example public network, in accordance with one or more aspects of the present disclosure.

FIG. 2 is a conceptual diagram illustrating processing of an example network packet in a service chain between an example access network and an example public network, in accordance with one or more aspects of the present disclosure. The example of FIG. 2 illustrates packet 101 originating at access network 106 (or from a device connected to access network 106), and being processed by services complex 109 before being output to public network 112. Packet 101 is processed pursuant to a service chain implemented by services complex 109. As illustrated in FIG. 2, services complex 109 includes service nodes 210A through 210F ("service nodes 210"), each of which are capable of performing one or more service functions within a service chain. Table 202 illustrates an example RTT values that may, for various hops in a service chain as described herein, be included within a network services header associated with packet 101.

In general, systems, devices, packets or data items, and/or components illustrated in Figures herein (e.g., packet 101, access network 106, public network 112 in FIG. 2) may correspond to like-numbered systems, devices, packets or data items, and/or components illustrated elsewhere herein (e.g., packet 101, access network 106, public network 112 in FIG. 1). Such like-numbered systems, devices, packets or data items, and/or components may be described in a manner consistent with the description provided in connection with such other illustrations. In some examples, however, such systems, devices, packets or data items, and/or components may involve alternative implementations with more, fewer, and/or different capabilities in different Figures. Further, one or more systems, devices, packets or data items, and/or components may represent and/or be described as an example or alternative implementation of systems, devices, packets or data items, and/or components illustrated in another figure, even if such systems, devices, packets or data items, and/or components do not have identical reference numerals. For instance, one or more of service nodes 210 in FIG. 2 may correspond to one or more of service nodes 110 of FIG. 1, and each of service nodes 210 may represent and/or be described as an example or alternative implementation of one of one or more of service nodes 110 in FIG. 1 or elsewhere.

In FIG. 2, various service nodes 210 are illustrated along with connections between various service nodes 210 and IP addresses associated with such connections. Further, round-trip time (RTT) values associated with each of the connections between service nodes 210 are shown in FIG. 2. For instance, the value for the RTT between service node 210A and service node 210B is 10 milliseconds, which may be an expected round-trip time, an observed round-trip time, or may be a value determined based on a probing mechanism or procedure or in another way. Similarly, the RTT value between service node 210B and service node 210E is 40 milliseconds, which again may be an expected round-trip time, or may be a value determined based on a probing procedure or based on other information. Where a probing procedure is used, information sufficient to periodically or occasionally update the RTT values between nodes may be collected and analyzed.

In the example of FIG. 2, each of service nodes 210 may maintain its own set of information about RTT values associated with its adjacent nodes. Each of service nodes 210 may use such information to select a next hop in a service chain. By using information about RTT values for adjacent nodes, each of service nodes 210 may help ensure that a service chain performance constraint, such as an RTT SLA associated with a given packet, is met or satisfied. Accordingly, since each of service nodes 210 may select one of service nodes 210 to perform any subsequent service functions, the service path for a particular packet may be considered dynamic, and might not be known prior to the completion of the service chain.

In accordance with one or more aspects of the present disclosure, service node 210A may determine a round-trip time service chain performance constraint or SLA that applies to packet 101. For instance, in FIG. 2, access network 106 receives packet 101 and outputs packet 101 to service node 210A. Service node 210A evaluates packet 101 and identifies an application associated with packet 101. Service node 210A further identifies one or more policies to be applied to packets for the identified application and/or one or more policies that may otherwise apply to packet 101. Based on this policy information, or based on other information, service node 210A determines the maximum duration of the total round-trip time associated with an SLA that applies to packet 101. In one example, service node 210A determines that the SLA indicates that no longer than 50 milliseconds should be consumed by the service chain (see table 202).

Service node 210A may identify one or more nodes capable of performing a service function while meeting the service chain performance constraint (i.e., the RTT SLA). For instance, in an example that can be described with reference to FIG. 2, identifies a service function that should be performed on packet 101. Service node 210A identifies service nodes 210 capable of performing the required function. Service node 210A also evaluates the information about the maximum duration of the total round-trip time associated with an SLA that applies to packet 101, and identifies service nodes 210 that are capable of performing the required function within the RTT SLA (i.e., 50 milliseconds). In some examples, multiple adjacent service nodes 210 may be capable of performing the relevant service function within the required RTT (e.g., in FIG. 2 service node 210B, service node 210C, service node 210F may each be capable of performing the required function within 50 milliseconds).

Service node 210A may select a node to perform the required service function. For instance, in the example being described with reference to FIG. 2, service node 210A may choose from among several qualifying nodes based on one or more criteria. In one example, service node 210A select the node having the lowest RTT value. In other examples, however, service node 210A may choose among the multiple qualifying service nodes 210 based on other considerations and/or local policy. Accordingly, service node 210A might not necessarily choose the node having the lowest RTT value, and instead, may use the RTT values of adjacent nodes to identify a group of nodes to consider as a next hop. From that group of nodes to consider, local policy or other considerations may be applied to choose one node from among the group of nodes. In the example being described, service node 210A chooses service node 210B, which is expected to consume 10 milliseconds of round-trip time.

Service node 210A may update packet 101 to include RTT SLA information. For instance, in the example being described with reference to FIG. 2, once service node 210A selects service node 210B, service node 210A adds information to packet 101 about the SLA requirements for the total round-trip time for the service chain. In some examples, service node 210A adds the information to the network services header of packet 101, and such information may reflect the amount of time expected to remain on the RTT SLA after processing by service node 210B. In such an example, service node 210A includes information indicating that 40 milliseconds are expected to remain from the original RTT SLA requirement after taking into account the RTT expected to be consumed by service node 210B when performing the appropriate service function. Service node 210A outputs packet 101 to service node 210B over path 201A. When traveling over path 201A, packet 101 includes information indicating 40 milliseconds remain in the SLA (see table 202).

Service node 210B may use RTT information when selecting a node for the next service function in the service chain. For instance, in the example being described, service node 210B receives packet 101 from service node 210A and performs the appropriate service function. Service node 210B chooses one of service nodes 210 to perform the next service function in the service chain. Service node 210B makes such a determination by evaluating the information about the remaining RTT SLA stored in the network service header of packet 101. Service node 210B limits its choice of available service nodes 210 to those service nodes 210 that are capable of performing the function within the remaining RTT SLA time (40 milliseconds). If more than one of service nodes 210 can perform the required function within the required time, service node 210B chooses among qualifying service nodes 210 based on other considerations or local policy, as described above. In the example being described, service node 210B chooses service node 210D, which is one of service nodes 210 capable of performing the next function in the service chain within the remaining RTT, as indicated by the information stored within the network services header of packet 101.

Service node 210B may update the RTT SLA information in packet 101. For instance, continuing with the example and with reference to FIG. 2, service node 210B determines that service node 210D is expected to consume 5 milliseconds of the remaining RTT SLA. Service node 210B therefore updates the network services header of packet 101 to reflect that 35 milliseconds remain in the RTT SLA. Service node 210B outputs packet 101 to service node 210D (path 201B). When traveling over path 201B, packet 101 thus includes information indicating that 35 milliseconds remain in the RTT SLA (see table 202).

Service node 210D may use the updated RTT information to select the next node in the service chain. For instance, still continuing with the example being described with reference to FIG. 2, service node 210D receives packet 101 from service node 210B and performs the appropriate service function. Service node 210D chooses one of service nodes 210 to perform the next service function, and as with earlier service nodes 210, service node 210D makes a choice by limiting its selection to those service nodes 210 capable of performing the appropriate service function within the remaining RTT SLA. In the example being described, service node 210D chooses service node 210F, which is expected to consume 30 milliseconds. Service node 210D updates the network services header of packet 101 to reflect that 5 milliseconds remain in the RTT SLA after the expected time consumed by service node 210F in performing the service function. When traveling over path 201C, therefore, packet 101 includes information indicating that 5 milliseconds remain in the RTT SLA (see table 202). Service node 210D outputs packet 101 to service node 210F.

Service node 210F may output packet 101 over public network 112. For instance, in the example of FIG. 2, service node 210F receives packet 101 from service node 210D. Service node 210F performs the appropriate service function. Service node 210F determines that it is the terminal node. Service node 210F outputs packet 101 to public network 112.

Figure 3A:
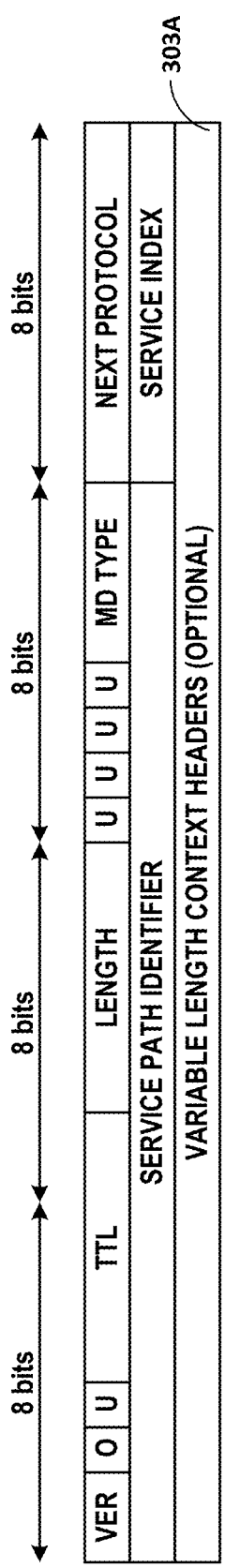
FIG. 3A and FIG. 3B are conceptual diagrams illustrating example network service headers that may be used to realize a service function chain, in accordance with one or more aspects of the present disclosure.
Figure 3B:
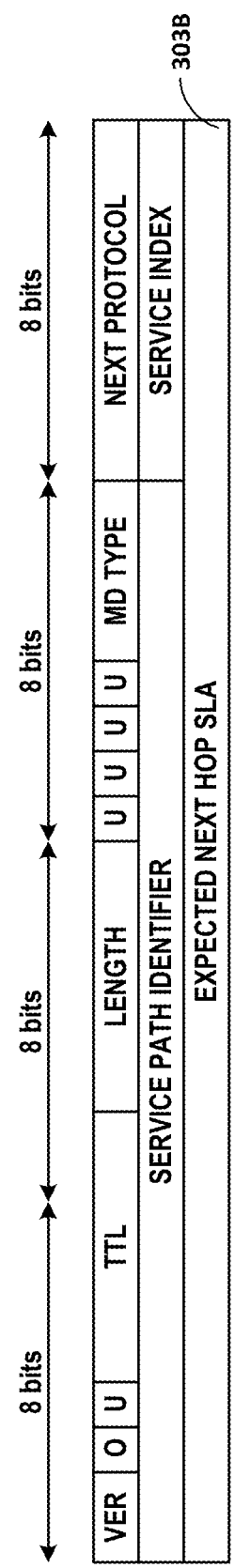

FIG. 3A and FIG. 3B are conceptual diagrams illustrating example network service headers (NSH) that may be used to realize a service function chain, in accordance with one or more aspects of the present disclosure. Header 301A of FIG. 3A and header 301B of FIG. 3B illustrate fields of a network service header consistent with RFC 8300 and/or consistent with an extension to RFC 8300. As shown in FIG. 3A and FIG. 3B, the first 64 bits of both header 301A and header 301B are the same, and include information about the version of the NSH ("Ver"), an OAM ("O") bit, a TTL field (indicating the maximum service function forwarder hops for a service function path), a length field, an MD Type field, and a Next Protocol field, as described in RFC 8300. Header 301A and header 301B also include a service path identifier (uniquely identifying a service function path) and a service index (providing a location within the service function path).

The header of FIG. 3A includes, starting after the first 64 bits, field 303A. Field 303A includes optional fixed or variable length context headers, also described in RFC 8300.

In some examples, field 303B of FIG. 3B, which may span some or all of the corresponding portion of field 303A of FIG. 3A, may be used for storing next hop SLA information. Specifically, field 303B may be used to carry, with the network packet, information about RTT SLA metrics for that packet. In some examples, field 303B may include data about the remaining RTT SLA associated with the network packet. Field 303B may be updated by one or more nodes (e.g., service nodes 210), in the manner described herein, as the network packet is processed by a service chain. In other examples, information stored within field 303B may include information about not just round-trip times, but may also or alternatively include information about other metrics that may also be subject to SLA requirements. Such metrics may include jitter, or information about permissible packet loss (e.g., based on an SLA specifying a maximum percentage of packet loss).

Figure 4:
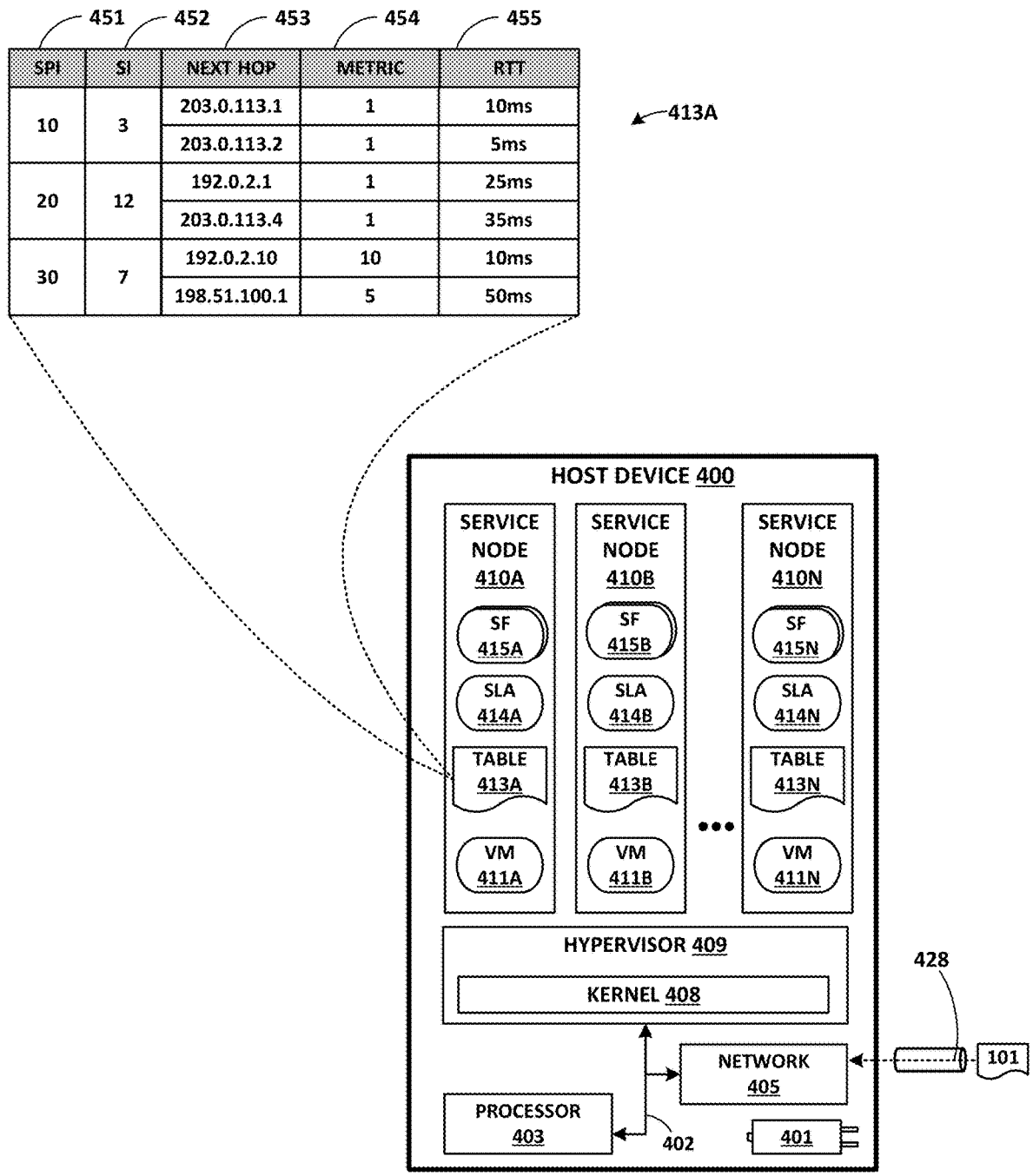
FIG. 4 is a block diagram illustrating an example host device that may provide an operating environment for one or more service nodes, in accordance with one or more aspects of the present disclosure.

FIG. 4 is a block diagram illustrating an example host device that may provide an operating environment for one or more service nodes, in accordance with one or more aspects of the present disclosure. In the example of FIG. 4, host device 400 includes underlying physical compute hardware that includes power source 401, one or more processors 403, and one or more network adapters 405. Network adapters 405 may receive packets being processed in a service chain, such as any of the other service chains described herein (e.g., service chains 128 of FIG. 1). One or more of the devices, modules, storage areas, or other components of host device 400 may be interconnected to enable inter-component communications (physically, communicatively, and/or operatively). In some examples, such connectivity may be provided by through communication channels (e.g., communication channels 402), a system bus, a network connection, an inter-process communication data structure, or any other method for communicating data.

Hypervisor 409 may serve as a virtual machine monitor that instantiates, creates, and/or executes virtual machines 411A through 411N ("virtual machines 411," representing any number of virtual machines) on an underlying host hardware device. In some examples, each of service nodes service nodes 410A, 410B, through 410N ("service nodes 410," and representing any number of service nodes) may be implemented through one or more virtual machines 411. In some contexts, hypervisor 409 may be referred to as a virtual machine manager (VMM). Hypervisor 409 may execute within the execution environment provided by a storage device and one or more processors 403 within host device 400 or on top of an operating system kernel (e.g., kernel 408). In some examples, hypervisor 409 is an operating system-level component that executes on a hardware platform (e.g., host device 400) to provide a virtualized operating environment and orchestration controller for virtual machines, and/or other types of virtual computing instances. In other examples, hypervisor 409 may be a software and/or firmware layer that provides a lightweight kernel and operates to provide a virtualized operating environment and orchestration controller for virtual machines, and/or other types of virtual computing instances. Hypervisor 409 may incorporate the functionality of kernel 408 (e.g., as a "type 1 hypervisor"), or may execute on a kernel (e.g., as a "type 2 hypervisor").

In the example illustrated in FIG. 4, service node 410A includes virtual machine 411A, as well as next hop selection table 413A, SLA module 414A, and one or more service function modules 415A. Similarly, service node 410B includes virtual machine 411B, next hop selection table 413B, SLA module 414B, and one or more service function modules 415B. And in general, service node 410N includes virtual machine 411N, next hop selection table 413N, SLA module 414N, and one or more service function modules 415N.

Next hop selection table 413A, for example, may represent a table of information that virtual machine 411A uses to select a next hop or a node to perform a function in a service chain. Next hop selection table 413A may include service path index column 451 and service index column 452 identifying a service path index and service index associated with various service paths. Possible next hops for a given service path index may each be identified by an address (next hop address column 453) and metric information enabling implementation of a local or other policy for selecting from among possible next hops (metric column 454).

In addition, for each respective service node 410, a next hop selection table 413 may include a column specifying additional metric information that can be used to help ensure that one or more SLA requirements are met. Next hop selection table 413A for service node 410A, for example, includes SLA metric column 455, which in the example shown in FIG. 4 may contain information about round-trip times associated with each possible next hop for a given service chain. In other examples, SLA metric column 455 may include other information, such as information relating to SLAs pertaining to jitter or packet loss. Each of virtual machines 411 or service nodes 410 may maintain include its own next hop selection table 413 that reflects SLA information (e.g., RTT information) associated with each of the adjacent nodes associated with a respective service node 410. Next hop selection tables 413 may be maintained by respective SLA modules 414, may be included within and/or stored within respective virtual machines 411, and may be dynamically updated by virtual machine 411 or by SLA module 414 as RTT or other information changes. Such information may change as, for example, loads on a network change.

Each of SLA modules 414 may perform functions relating to selection of a service node to perform a function in a service chain. For instance, SLA module 414A of service node 410A may operate as an application or service executing on virtual machine 411A. SLA module 414A may evaluate information in next hop selection table 413A and determine, based on a given service path index and information in SLA metric column 455 associated with that service path index, which of the next hop addresses to choose for performing a function in a service chain. In some examples, each of SLA modules 414 may limit its selection of a service path (i.e., a next hop) to those RTT values that enable any applicable service chain performance constraints on RTT times (i.e., an RTT SLA) to be satisfied. If multiple next hops are available to perform a given function while also satisfying an applicable RTT SLA, a given SLA module 414 may select a next hop based on other information, such as a local network policy, or information in metric column 454 of the appropriate next hop selection table 413.

Each of service nodes 410 include one or more of service function modules 415, which may operate as applications or services executing on a respective virtual machine 411, and may perform each of the services within a service chain. In some examples, one or more of service function modules 415 may apply, to given packet (e.g., packet 101) or network traffic, firewall and security services, carrier grade network address translation (CG-NAT), media optimization (voice/video), IPSec/VPN services, deep packet inspection (DPI), HTTP filtering, counting, accounting, charging, load balancing of packet flows, and/or other types of services.

Although service nodes 410 illustrated in FIG. 4 are shown executing on a single host device 400, in other examples, one or more of service nodes 410 may execute on multiple host devices distributed across one or more data centers and/or distributed across one or more geographical areas. Further, although each of service nodes 410 are illustrated as being implemented by a single virtual machine 411, in other examples, a single virtual machine 411 may implement multiple service nodes 410, or a single service node 410 may be implemented by multiple virtual machines 411. Similarly, although each of service nodes 410 are illustrated as being implemented in a virtual machine environment, one or more of service nodes 410 may be implemented pursuant to other virtualization arrangements (e.g., through a containerized environment) or through one or more bare metal servers.

In accordance with one or more aspects of the present disclosure, host device 400 may receive packet 101 for processing in a service chain. For instance, in an example that can be described with reference to FIG. 4, network adapter 405 detects input and outputs to hypervisor 409 an indication of input. Hypervisor 409 determines that the input corresponds to packet 101 being received pursuant to service chain 428. Hypervisor 409 further determines that packet 101 is destined for service node 410A. Hypervisor 409 outputs packet 101 to virtual machine 411A associated with service node 410A.

One or more of service nodes 410 may perform a function in a service chain. For instance, continuing with the example being described and with reference to FIG. 4, hypervisor 409 identifies a service function that is to be performed on packet 101 pursuant to service chain 428. Virtual machine 411A of service node 410A causes one or more of service function modules 415A to perform the identified service function.

Service node 410A may select a service node to perform an additional service function. For instance, again referring to the example being described and with reference to FIG. 4, virtual machine 411A determines that service chain 428 requires one more additional services to be performed on packet 101. Virtual machine 411A outputs information about the required additional services to SLA module 414A. SLA module 414A determines that service chain 428 is associated with service path index 10 and service index 3 (i.e., the first row of next hop selection table 413A). SLA module 414A evaluates information about SLA requirements that may be stored in a network services header of packet 101, and determines, in one example, that only 8 milliseconds remain in the RTT SLA for packet 101. SLA module 414A identifies address 203.0.113.2 as an appropriate next hop, since the service node at that address is expected to complete the service function in a RTT of 5 milliseconds (see next hop selection table 413A). The service node associated with address 203.0113.1, on the other hand, is expected to require 10 milliseconds RTT, and that exceeds the RTT SLA for packet 101, as indicated by the network services header of packet 101. Accordingly, SLA module 414A removes 203.0.113.1 from consideration when selecting a service node to perform the next function in service chain 428. SLA module 414A selects the service node at 203.0.113.2 for performing the next service function.

Host device 400 may perform the next function in service chain 428. For instance, once again referring to the example being described and with reference to FIG. 4, SLA module 414A of service node 410A updates packet 101 (e.g., the network services header of packet 101) to reflect that after the next service function is performed, 3 milliseconds are expected to remain from the RTT SLA for packet 101. (This 3 millisecond value is calculated by subtracting 5 milliseconds of RTT expected to be consumed by the next service function from the 8 milliseconds remaining in the RTT SLA as indicated by the network services header of packet 101). Virtual machine 411A outputs to hypervisor 409 information about the appropriate next hop. Hypervisor 409 determines that the address 203.0.113.1 corresponds to service node 410B being hosted by host device 400. Hypervisor 409 outputs packet 101 to virtual machine 411B of service node 410B. Virtual machine 411B causes one or more of service function modules 415B to perform the appropriate service function within the time remaining in the RTT SLA for packet 101.

In the example being described in connection with FIG. 4, packet 101 is processed by consecutive service nodes within the same host device 400. In other examples, however, different service functions may be performed on packet 101 by different host devices 400, in different data centers, and/or in different geographical regions.

Modules illustrated in FIG. 2 (e.g., virtual machines 411A through 411N and/or SLA modules 414A through 414N) and/or illustrated or described elsewhere in this disclosure may perform operations described using software, hardware, firmware, or a mixture of hardware, software, and firmware residing in and/or executing at one or more computing devices. For example, a computing device may execute one or more of such modules with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform. In other examples, functionality provided by a module could be implemented by a dedicated hardware device.

Although certain modules, data stores, components, programs, executables, data items, functional units, and/or other items included within one or more storage devices may be illustrated separately, one or more of such items could be combined and operate as a single module, component, program, executable, data item, or functional unit. For example, one or more modules or data stores may be combined or partially combined so that they operate or provide functionality as a single module. Further, one or more modules may interact with and/or operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated.

Further, each module, data store, component, program, executable, data item, functional unit, or other item illustrated within a storage device may be implemented in various ways. For example, each module, data store, component, program, executable, data item, functional unit, or other item illustrated within a storage device may be implemented as a downloadable or pre-installed application or "app." In other examples, each module, data store, component, program, executable, data item, functional unit, or other item illustrated within a storage device may be implemented as part of an operating system executed on a computing device.

Figure 5:
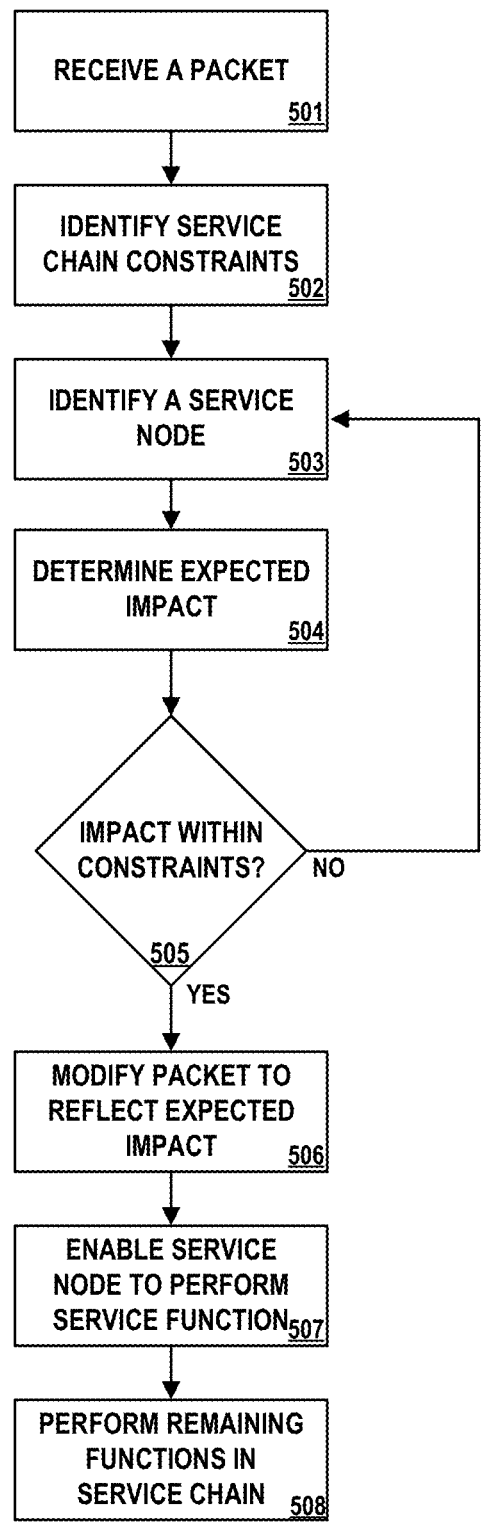
FIG. 5 is a flow diagram illustrating operations performed by an example service node in accordance with one or more aspects of the present disclosure.

FIG. 5 is a flow diagram illustrating operations performed by an example service node in accordance with one or more aspects of the present disclosure. FIG. 5 is described herein within the context of services complex 109 and one or more of service nodes 210 of FIG. 2. In other examples, operations described in FIG. 5 may be performed by one or more other components, modules, systems, or devices. Further, in other examples, operations described in connection with FIG. 5 may be merged, performed in a difference sequence, omitted, or may encompass additional operations not specifically illustrated or described.

In the process illustrated in FIG. 5, and in accordance with one or more aspects of the present disclosure, services complex 109 may receive a packet (501). For instance, in some examples, access network 106 receives packet 101. Access network 106 outputs packet 101 to service node 210A within services complex 109.

Services complex 109 may identify service chain constraints (502). For instance, in some examples, service node 210A evaluates packet 101 and identifies a service chain that is to be applied to packet 101. Service node 210A determines, based on the service chain to be applied to packet 101, that a performance constraint is applicable to packet 101 and is to be satisfied when processing packet 101. Such a constraint may be a service level agreement that mandates that packet 101 be processed by the service chain in no more than specified period of time, or a specified round-trip time (RTT), such as 50 milliseconds.

Services complex 109 may identify a service node to perform a service function (503). For instance, in some examples, service node 210A identifies which of service nodes 210 are capable of performing the first service function. From the service nodes 210 capable of performing the first service function, service node 210A identifies which such service nodes 210 are capable of performing the first service function within the time mandated by the service level agreement. In the example being described, service node 210A determines that service node 210B is both capable of performing the first service function, and can complete the service chain operation within the 50 milliseconds mandated by the service level agreement.

Services complex 109 may determine an expected impact that performing the service function will have (504). For instance, in some examples, service node 210A determines, based on information maintained by service node 210A (e.g., SLA metric column 455 of next hop selection table 413 of FIG. 4), that service node 210B will consume 10 milliseconds in round-trip time to perform the first service function. The 10 milliseconds value may include both the round-trip link latency between service node 210A and service node 210B as well as the latency in service node 210B performing the service function. Accordingly, service node 210A determines that service node 210B performing the first service function will impact the maximum RTT mandated by the service level agreement by 10 milliseconds. Specifically, service node 210A determines that after service node 210B performs the service function, 40 milliseconds will remain to complete the service chain while complying with service level agreement. If the expected time to perform the service function by service node 210B is too long and consumes all of the RTT remaining on the service level agreement, service node 210A may choose a different service node (NO path from 505). Otherwise, service node 210A selects service node 210B to perform the first service function (YES path from 505).

Services complex 109 may modify the packet to reflect the expected impact (506). For instance, in some examples, service node 210A inserts into the network services header of packet 101 information indicating that 40 milliseconds remain to complete the service chain to comply with the service level agreement. This information can be used by later service nodes to select an appropriate service node to perform service functions further along the chain, after service node 210B performs the first service function.

Services complex 109 may enable the service node 210B to perform the service function (507). For instance, in some examples, service node 210A outputs packet 101 to service node 210B. Services complex 109 enables service node 210B to perform the first service function.

In some examples, services complex 109 may continue to perform the remaining service function in the service chain (508). For instance, in some examples, service node 210B may, after performing the first service function, choose another one of service nodes 210 to perform the next service function in the service chain. In making such a choice, service node 210B may limit its selection to those service nodes 210 that are capable of performing the next service function within the time specified in the network services header of packet 101 (i.e., now 40 milliseconds). Service node 210B may then update the network services header to reflect the amount of time (e.g., RTT) that is expected to be consumed by the next service node 210 that performs the next service function. In some examples, updating the network service header to reflect that amount of time may involve subtracting the expected RTT time to perform the next service function from the 40 milliseconds currently reflected by packet 101. Thus, service node 210B may update the network services header to reflect that some amount time less than 40 milliseconds remains to complete the service chain. Each additional service node 210 may perform a similar procedure for each function in the service chain, thereby maintaining information with packet 101 that reflects, at each service node 210, how much time remains to complete the service chain.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

For ease of illustration, only a limited number of devices (e.g., data sources 210, client devices 220, computing systems 240, administrator devices 290, as well as others) are shown within the Figures and/or in other illustrations referenced herein. However, techniques in accordance with one or more aspects of the present disclosure may be performed with many more of such systems, components, devices, modules, and/or other items, and collective references to such systems, components, devices, modules, and/or other items may represent any number of such systems, components, devices, modules, and/or other items.

The Figures included herein each illustrate at least one example implementation of an aspect of this disclosure. The scope of this disclosure is not, however, limited to such implementations. Accordingly, other example or alternative implementations of systems, methods or techniques described herein, beyond those illustrated in the Figures, may be appropriate in other instances. Such implementations may include a subset of the devices and/or components included in the Figures and/or may include additional devices and/or components not shown in the Figures.

The detailed description set forth above is intended as a description of various configurations and is not intended to represent the only configurations in which the concepts described herein may be practiced. The detailed description includes specific details for the purpose of providing a sufficient understanding of the various concepts. However, these concepts may be practiced without these specific details. In some instances, well-known structures and components are shown in block diagram form in the referenced figures in order to avoid obscuring such concepts.

Accordingly, although one or more implementations of various systems, devices, and/or components may be described with reference to specific Figures, such systems, devices, and/or components may be implemented in a number of different ways. For instance, one or more devices illustrated in the Figures herein (e.g., FIG. 1 and/or FIG. 2) as separate devices may alternatively be implemented as a single device; one or more components illustrated as separate components may alternatively be implemented as a single component. Also, in some examples, one or more devices illustrated in the Figures herein as a single device may alternatively be implemented as multiple devices; one or more components illustrated as a single component may alternatively be implemented as multiple components. Each of such multiple devices and/or components may be directly coupled via wired or wireless communication and/or remotely coupled via one or more networks. Also, one or more devices or components that may be illustrated in various Figures herein may alternatively be implemented as part of another device or component not shown in such Figures. In this and other ways, some of the functions described herein may be performed via distributed processing by two or more devices or components.

Further, certain operations, techniques, features, and/or functions may be described herein as being performed by specific components, devices, and/or modules. In other examples, such operations, techniques, features, and/or functions may be performed by different components, devices, or modules. Accordingly, some operations, techniques, features, and/or functions that may be described herein as being attributed to one or more components, devices, or modules may, in other examples, be attributed to other components, devices, and/or modules, even if not specifically described herein in such a manner.

Although specific advantages have been identified in connection with descriptions of some examples, various other examples may include some, none, or all of the enumerated advantages. Other advantages, technical or otherwise, may become apparent to one of ordinary skill in the art from the present disclosure. Further, although specific examples have been disclosed herein, aspects of this disclosure may be implemented using any number of techniques, whether currently known or not, and accordingly, the present disclosure is not limited to the examples specifically described and/or illustrated in this disclosure.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

What is claimed is:

1. A computing system comprising processing circuitry and a plurality of service nodes, wherein the processing circuitry is configured to:
   receive a packet;
   identify a performance constraint associated with a service chain representing a series of service functions to be performed on the packet by one or more of the service nodes;
   determine an expected impact that performance of a first service function will have on satisfying the performance constraint, wherein the first service function is one of the series of service functions to be performed on the packet;
   modify the packet to reflect the expected impact that performance of the first service function will have on satisfying the performance constraint;
   identify, based on the service chain performance constraint, a service node to perform the first service function on the packet;
   enable the service node to perform the first service function on the packet;
   determine an expected impact that performance of a second service function will have on satisfying the performance constraint, wherein the second service function is another one of the series of service functions to be performed on the packet; and
   modify the packet to reflect the expected impact that performance of the second service function will have on satisfying the performance constraint.

2. The computing system of claim 1, wherein to modify the packet to reflect the expected impact that performance of the first service function will have on satisfying the performance constraint, the processing circuitry is further configured to:
   add data to a header included within the packet.

3. The computing system of claim 2, wherein to modify the packet to reflect the expected impact that performance of the second service function will have on satisfying the performance constraint, the processing circuitry is further configured to:
   update the data added to the header included within the packet.

4. The computing system of claim 3, wherein the service node is a first service node, and wherein to determine the expected impact that performance of the second service function will have on satisfying the performance constraint, the processing circuitry is further configured to:
 identify, based on the service chain performance constraint, a second service node to perform the second service function on the packet; and
 determine, after the first service function has been performed, an expected impact that performance of a second service function will have on satisfying the performance constraint.

5. The computing system of claim 4, wherein to identify the second service node, the processing circuitry is further configured to:
 identify a service node that enables the second service function to be performed within the performance constraint.

6. The computing system of claim 1, wherein the plurality of service nodes are located across a plurality of data centers.

7. The computing system of claim 1, wherein to modify the packet, the processing circuitry is further configured to:
 modify a network service header included within the packet.

8. The computing system of claim 1, wherein the service chain performance constraint involves one or more of:
 round-trip time, jitter, or packet loss.

9. A method comprising:
 receiving, by a computing system comprising a plurality of service nodes, a packet associated with a service chain representing a series of services to be performed on the packet;
 identifying, by the computing system, a performance constraint associated with the service chain;
 determining, by the computing system, an expected impact that performance of a first service function will have on satisfying the performance constraint, wherein the first service function is one of the series of services to be performed on the packet;
 modifying the packet, by the computing system, to reflect the expected impact that performance of the first service function will have on satisfying the performance constraint;
 identifying, by the computing system and based on the service chain performance constraint, a service node to perform the first service function on the packet;
 enabling the service node to perform the first service function on the packet,
 determining an expected impact that performance of a second service function will have on satisfying the performance constraint, wherein the second service function is another one of the series of services to be performed on the packet; and
 modifying the packet to reflect the expected impact that performance of the second service function will have on satisfying the performance constraint.

10. The method of claim 9, wherein modifying the packet to reflect the expected impact that performance of the first service function will have on satisfying the performance constraint includes:
 adding data to a header included within the packet.

11. The method of claim 10, wherein modifying the packet to reflect the expected impact that performance of the second service function will have on satisfying the performance constraint includes:
 updating the data added to the header included within the packet.

12. The method of claim 11, wherein the service node is a first service node, and wherein determining the expected impact that performance of the second service function will have on satisfying the performance constraint includes:
 identifying, based on the service chain performance constraint, a second service node to perform the second service function on the packet; and
 determining, after the first service function has been performed, an expected impact that performance of a second service function will have on satisfying the performance constraint.

13. The method of claim 12, wherein identifying the second service node includes:
 identifying a service node that enables the second service function to be performed within the performance constraint.

14. The method of claim 9, wherein to modifying the packet includes:
 modifying a network service header included within the packet.

15. The method of claim 9, wherein the service chain performance constraint involves one or more of:
 round-trip time, jitter, or packet loss.

16. A non-transitory computer-readable storage medium comprising instructions that, when executed, configure processing circuitry of a computing system to:
 receive a packet;
 identify a performance constraint associated with a service chain representing a series of service functions to be performed on the packet by one or more service nodes;
 determine an expected impact that performance of a first service function will have on satisfying the performance constraint, wherein the first service function is one of the series of service functions to be performed on the packet;
 modify the packet to reflect the expected impact that performance of the first service function will have on satisfying the performance constraint;
 identify, based on the service chain performance constraint, a service node to perform the first service function on the packet;
 enable the service node to perform the first service function on the packet;
 determine an expected impact that performance of a second service function will have on satisfying the performance constraint, wherein the second service function is another one of the series of service functions to be performed on the packet; and
 modify the packet to reflect the expected impact that performance of the second service function will have on satisfying the performance constraint.

\* \* \* \* \*